United States Patent [19]
Gnauck et al.

[11] Patent Number: 5,532,868
[45] Date of Patent: Jul. 2, 1996

[54] APPARATUS AND METHOD FOR COMPENSATING CHROMATIC DISPERSION PRODUCED IN OPTICAL PHASE CONJUGATION OR OTHER TYPES OF OPTICAL SIGNAL CONVERSION

[75] Inventors: Alan H. Gnauck, Middletown; Robert M. Jopson, Rumson, both of N.J.

[73] Assignee: AT&T Corp., Murray Hill, N.J.

[21] Appl. No.: 311,481

[22] Filed: Sep. 23, 1994

[51] Int. Cl.[6] .................................................. G02F 1/35
[52] U.S. Cl. ........................ 359/332; 385/24; 385/122
[58] Field of Search .................................. 359/326–332; 385/24, 122

[56] References Cited

U.S. PATENT DOCUMENTS

| | | | |
|---|---|---|---|
| 5,365,362 | 11/1994 | Gnauck et al. | 385/122 X |
| 5,386,314 | 1/1995 | Jopson | 359/326 |
| 5,400,164 | 3/1995 | Kurtzke et al. | 359/326 X |
| 5,400,165 | 3/1995 | Gnauck et al. | 359/326 X |

OTHER PUBLICATIONS

Yariv, A., et al., "Compensation for Channel Dispersion by Nonlinear Opical Phase Conjugation," Optics Letters, vol. 4, No. 2, Feb. 1979, pp. 52–54.

Watanabe, S., et al., "Compensation of Chromatic Dispersion in a Single–Mode Fiber by Optical Phase Conjugation," IEEE Photonics Technology Letters, vol. 5, No. 1, Jan. 1993, pp. 92–95.

Gnauck, A. H., et al., "10–Gb/s 360–km Transmission Over Dispersive Fiber Using Midsystem Spectral Inversion," Photon. Technol. Lett., vol. 5, No. 6, Jun. 1993, pp. 663–666.

Tatham, M. C., et al., "Compensation of Fibre Chromatic Dispersion by Mid–Way Spectral Inversion in a Semiconductor Laser Amplifier," ECOC '93 Postdeadline Digest, Montreaux, Sep. 1993, pp. 61–64.

Gnauck, A. H., et al., "Transmission of Two Wavelength–Multiplexed 10–Gb/s Channels Over 560 km of Dispesive Fibre," Electron. Lett., vol. 30, No. 9, Apr. 28, 1994, pp. 727–728.

Pepper, D. M., and Yariv, A., "Compensation for Phase Distortions in Nonlinear Media by Phase Conjugation," Opt. Lett., vol. 5, No. 2, Feb. 1980, pp. 59–60.

Kikuchi, K., and Lorrattanasane, C., "Compensation for Pulse Waveform Distortion in Ultra–Long Distance Optical Communication Systems by Using Nonlinear Optical Phase Conjugator," Optical Amplifiers and Their Applications, Technical Digest, vol. 14, Jul. 4–6, 1993, Yokohama, Japan, pp. 22–25.

Kurtzke, C., and Gnauck, A. H., "How to Increase Capacity Beyond 200 Tbit/s km Without Solitons," Proc. of the 19th European Conference on Optical Communication, vol. 3, Sep. 12–16, 1993, Montreux, Switzerland, pp. 45–48.

(List continued on next page.)

Primary Examiner—John D. Lee

[57] ABSTRACT

An apparatus and method for providing dispersion compensation for chromatic dispersion introduced in the signal conversion of an optical signal. An exemplary apparatus in accordance with the present invention includes a nonlinear conversion medium arranged within an optical signal path of the optical signal. The conversion medium receives the optical signal and generates a converted optical signal therefrom. At least one dispersion compensator is arranged within the signal path to provide an amount of chromatic dispersion suitable to offset a portion of the chromatic dispersion introduced in the converted signal by the nonlinear conversion medium. The nonlinear medium may be a length of dispersion-shifted fiber used to phase conjugate and/or frequency shift an input optical signal in an optical system utilizing, for example, optical phase conjugation to cancel the effects of fiber nonlinearities. The dispersion compensator may be placed in the optical signal path either before or after the nonlinear conversion medium, or may be distributed within the medium.

34 Claims, 7 Drawing Sheets

OTHER PUBLICATIONS

Pieper, W., et al., "Nonlinearity–Insensitive Standard–Fibre Transmission Based on Optical–Phase Conjugation in a Semiconductor–Laser Amplifier," Electronics Letters, vol. 30, No. 9, Apr. 28, 1994, pp. 724–726.

Watanabe, S., and Chikama, T., "Cancellation of Four–wave Mixing in Multichannel Fibre Transmission by Midway Optical Phase Conjugation," Electronics Letters, vol. 30, No. 14, Jul. 7, 1994, pp. 1156–1157.

Xu, C. Q., et al., "Efficient Broadband Wavelength Converter for WDM Optical Communication Systems," OFC '94 Technical Digest, paper No. ThQ4, pp. 250–251, Feb. 1994.

Hagimoto, K., et al., "Penalty Free Dual–Channel 10 Gbit/s Transmission Over 132 km Standard Fiber Using a PLC Delay Equalizer With –830 ps/nm," OFC '94 Technical Digest, Postdeadline Papers, Feb. 20–25, 1994, San Jose, California, pp. 112–115.

Takiguchi, K., et al., "Dispersion Compensation Using a Planar Lightwave Circuit Optical Equalizer," IEEE Photonics Technology Letters, vol. 6, No. 4, Apr. 1994, pp. 561–564.

Hill, K. O., et al., "Aperiodic In–Fiber Bragg Gratings for Optical Fiber Dispersion Compensation," OFC '94 Technical Digest, Postdeadline Papers, Feb. 20–25, 1994, San Jose, California, pp. 17–20.

Onishi, M., et al., "Dispersion Compensating Fiber With a Figure of Merit Compact Packaging," Technical Digest of the Fifth Optoelectronics Conference, Jul. 12–15, 1994, Makuhari Messe, Japan, pp. 126–127.

Poole, C.D., et al., "Elliptical–Core Dual–Mode Fiber Dispersion Compensator," Proceedings of the 19th European Conference on Optical Communication, vol. 3, Sep. 27–Oct. 1, 1992, Berline, Germany, pp. 863–866.

Lundin, R., "Dispersion Flattening in a W Fiber," Applied Optics, vol. 33, No. 6, Feb. 20, 1994, pp. 1011–1014.

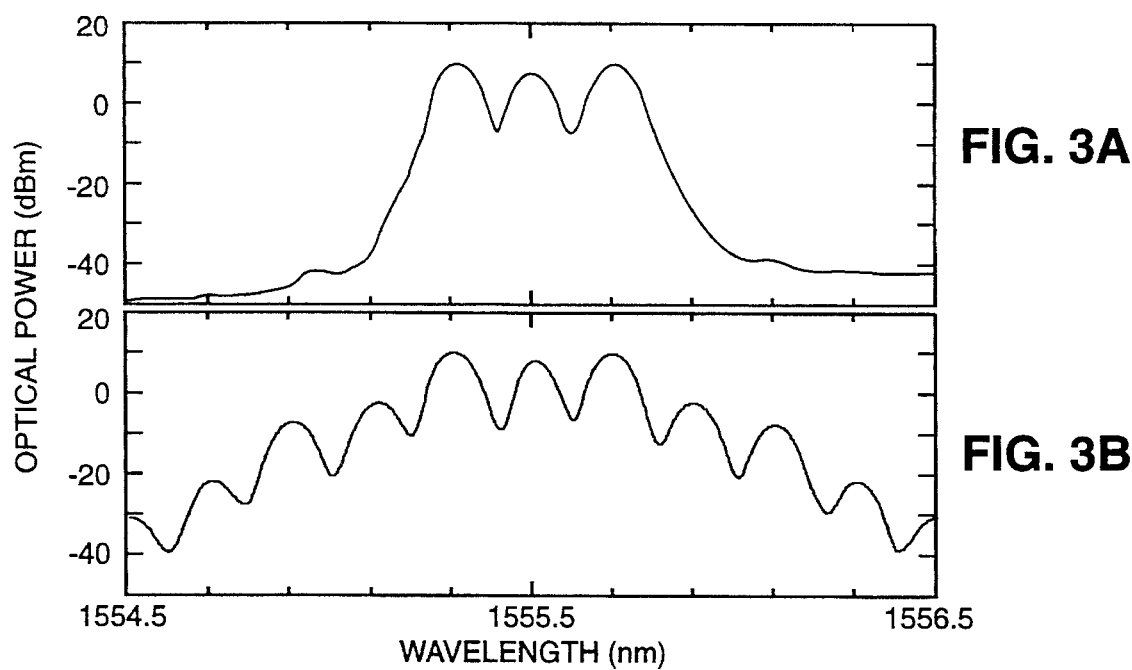
FIG. 3A
FIG. 3B
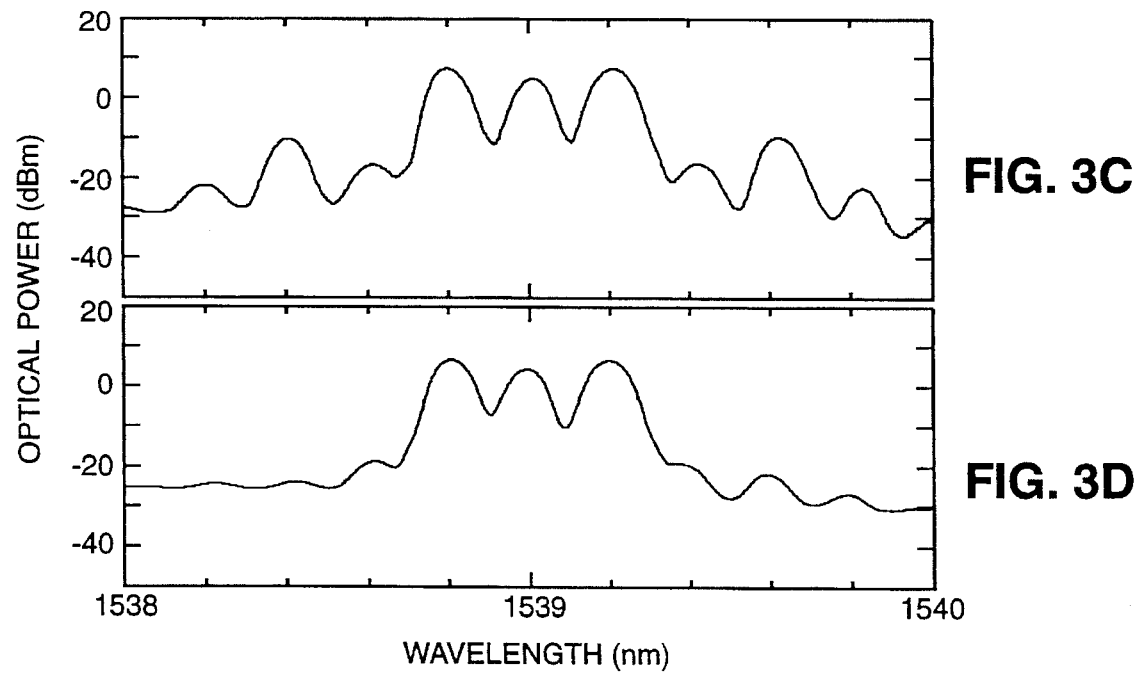
FIG. 3C
FIG. 3D 100 ps

APPARATUS AND METHOD FOR COMPENSATING CHROMATIC DISPERSION PRODUCED IN OPTICAL PHASE CONJUGATION OR OTHER TYPES OF OPTICAL SIGNAL CONVERSION

BACKGROUND OF THE INVENTION

1. Field of the Invention

The present invention relates generally to improvements in optical communication systems. More particularly, the present invention relates to chromatic dispersion compensation in optical communication systems which utilize optical phase conjugation or other types of optical signal conversion.

2. Description of the Prior Art

In optical communication systems which utilize optical fiber as a transmission medium, chromatic dispersion and fiber nonlinearities present significant obstacles to achieving higher system data rates and longer repeaterless transmission distances. Chromatic dispersion, often simply called dispersion, refers to a phenomenon in which the speed of an optical signal through an optical transmission medium such as fiber varies as a function of the optical signal wavelength. The problem of chromatic dispersion is particularly significant in the standard single-mode fiber (SMF) making up much of the world's existing optical fiber infrastructure. Standard SMF typically exhibits a dispersion zero at a wavelength of about 1300 nm, with positive dispersion for wavelengths longer than the dispersion zero.

Dispersion can be expressed in terms of variations in the propagation constant of the fiber with respect to frequency. First- and second-order group velocity dispersion refer to the second and third derivatives of the fiber propagation constant $\beta$ with respect to angular frequency $\omega$, or $\beta_2$ and $\beta_3$, respectively. Higher order dispersion terms can be approximated as zero in most applications. When used in the context of lightwave transmission systems, first- and second-order dispersion are commonly expressed in terms of derivatives with respect to wavelength. Thus, first-order group velocity dispersion is typically expressed as a change in pulse propagation time over a unit length of fiber with respect to a change in pulse wavelength. In this case, the symbol $D(\lambda)$ is often used to refer to first-order group velocity dispersion, and the units are typically picoseconds per nanometer-kilometer (ps/nm-km). Second-order group velocity dispersion is then expressed, using units of $\lambda ps/nm^2$-km, as the derivative with respect to wavelength of $D(\lambda)$.

An important fiber nonlinearity that can limit transmission capability is the Kerr effect, in which the index of refraction increases with the intensity of an applied optical signal. Changes in the fiber index of refraction modulate the phase of an optical signal passing through the fiber, and thereby redistribute the signal frequency spectrum. In systems in which the optical signal modulates itself, this phenomenon is generally known as self-phase modulation. Self-phase modulation creates lower frequencies toward the leading edge of an optical signal pulse and creates higher frequencies toward the trailing edge. In multi-channel systems, in which one signal causes modulation of other signals, the phenomenon manifests itself as either cross-phase modulation or four-photon mixing. For both single-channel and multi-channel systems, the resulting changes in frequency distribution are translated to amplitude modulation by the fiber dispersion. The interplay between chromatic dispersion and nonlinearities such as the Kerr effect therefore can lead to increasing optical signal distortion as a function of transmission distance. For long distance communication over optical fiber, therefore, dispersion and nonlinearities must be controlled, compensated or suppressed.

Midspan optical phase conjugation is a technique which has been used to alleviate the effects of chromatic dispersion in optical systems. Because the phase conjugate of an optical pulse is, in effect, a time reversal of the pulse, an optical phase conjugator placed at the midpoint of an optical fiber span allows the first-order group velocity dispersion of the first half of the span to be compensated by the identical first-order group velocity dispersion produced as the conjugated signal propagates along the second half of the span. See, for example, A. Gnauck, R. Jopson and R. Derosier, "10 Gbit/s 360 km Transmission over Dispersive Fiber Using Midsystem Spectral Inversion," IEEE Photonics Technology Letters, Vol. 5, No. 6, pp. 663–666, June 1993; and S. Watanabe et al., "Compensation of Chromatic Dispersion in a Single-mode Fiber by Optical Phase Conjugation," IEEE Photonic Technology Letters, Vol. 5, No. 1, pp. 92–95, January 1993. Dispersion compensation using optical phase conjugation has also been demonstrated for wavelength division multiplexed (WDM) systems. See, for example, A. Gnauck, R. Jopson, P. Iannone, and R. Derosier, "Transmission of two wavelength-multiplexed 10 Gbit/s channels over 560 km of dispersive fibre," Electronics Letters, Vol 30 No. 9, pp. 727–728, April 1994.

U.S. patent application Ser. No. 08/120 014 (now U.S. Pat. No. 5,365,362) entitled "Ultra-High Capacity Non-Soliton Optical Transmission Using Optical Phase Conjugation," assigned to the assignee of the present invention and incorporated herein by reference, first recognized that the effects of fiber span nonlinearities could be compensated using optical phase conjugation. An exemplary optical system described in U.S. Pat. No. 5,365,362 adjusts optical signal power in a fiber span by selecting appropriate number, spacings and output power for in-line amplifiers such that the effects of fiber non-linearities are compensated. Further detail regarding compensation of fiber nonlinearities using optical phase conjugation may be found in, for example, C. Kurtzke and A. Gnauck, "How to Increase Capacity beyond 200 Tbit/s-km without Solitons," ECOC '94 Proceedings, Vol. 3, Postdeadline Paper No. ThC 12.12, pp. 45–48, Montreux, Switzerland, September 1993; W. Pieper et al., "Nonlinearity-insensitive standard-fibre transmission based on optical-phase conjugation in a semiconductor-laser amplifier," Electronics Letters, Vol. 30, No. 9, pp. 724–726, 1994; and S. Watanabe and T. Chikama, "Cancellation of four-wave mixing in multichannel fibre transmission by midway optical phase conjugation," Electronics Letters, Vol. 30, No. 14, pp. 1156–1157, July 1994.

An additional concern which may arise in the optical systems described in U.S. Pat. No. 5,365,362 is the effect of chromatic dispersion introduced by the optical phase conjugator itself. For example, a common technique for phase conjugating an optical signal is four-photon mixing in a length of dispersion-shifted fiber (DSF). Efficient mixing in the DSF generally requires proper phase matching, which may be achieved by placing a pump signal wavelength near the dispersion zero of the DSF or, if two pump signals are used, by placing the average of their wavelengths near the dispersion zero. It has been discovered, however, that under these conditions chromatic dispersion in the DSF phase conjugator can significantly distort the phase conjugated output signal. In a phase conjugator consisting of 20 km of DSF with a dispersion zero at 1550 nm, a pump signal at a wavelength of 1550 nm and an input signal at a wavelength of 1554 nm, a phase conjugated output signal will be generated at a wavelength of approximately 1546 nm. If the DSF has a typical second-order dispersion value of 0.08 ps/nm$^2$-km, the DSF will produce a total first-order dispersion at the wavelength of the conjugated signal of (1546 nm–1550 nm)×0.08 ps/nm$^2$-km, or 0.32 ps/nm-km. The conjugated signal at the output of the DSF will therefore exhibit a substantial additional chromatic dispersion of (−0.32 ps/nm-km)×(20 km), or −6.4 ps/nm. The chromatic dispersion produced within an optical phase conjugator can thus be sufficiently large to reduce or eliminate any benefit obtained from the phase conjugation. Similar concerns apply with other types of optical signal convertors utilizing DSF, single-mode fiber (SMF) or other alternative nonlinear conversion media.

As is apparent from the above, a need exists for an optical phase conjugator, frequency shifter or other signal convertor which includes compensation for chromatic dispersion introduced as a result of the conversion.

SUMMARY OF THE INVENTION

The present invention provides an apparatus and method which compensate for chromatic dispersion introduced in nonlinear media performing optical phase conjugation, frequency shifting and/or other signal conversion processes. An exemplary apparatus in accordance with one aspect of the present invention may include a nonlinear conversion medium arranged within an optical signal path and adapted to receive an optical signal and to generate a converted optical signal therefrom; and at least one dispersion compensator arranged within the optical signal path to provide an amount of chromatic dispersion suitable to offset a portion of the chromatic dispersion introduced in the converted signal by the nonlinear conversion medium. The nonlinear conversion medium may be, for example, a length of optical fiber used to perform optical phase conjugation and/or frequency shifting of an input optical signal via four-photon mixing. Alternatively, the nonlinear medium may be an active or passive semiconductor, a nonlinear crystal or any other nonlinear medium suitable for converting an optical signal in frequency and/or phase. The dispersion compensator may be placed either before or after the nonlinear medium in the optical signal path. In other embodiments of the present invention, the dispersion compensator may be distributed within the nonlinear conversion medium.

An exemplary method in accordance with another aspect of the present invention may include the steps of applying an optical signal to a nonlinear conversion medium arranged in a signal path of the optical signal; generating a converted optical signal in the nonlinear medium from the optical signal; and compensating for a portion of the chromatic dispersion introduced in the converted signal by the nonlinear medium by providing an offsetting amount of chromatic dispersion in the optical signal path. The step of compensating for the chromatic dispersion introduced by the nonlinear medium may include providing additional chromatic dispersion either before, after or distributed within the nonlinear medium. The nonlinear medium may be part of, for example, an optical phase conjugator used to compensate for the interplay between nonlinearities and chromatic dispersion in an optical fiber span.

The present invention provides compensation of chromatic dispersion introduced in signal conversion processes such as optical phase conjugation and/or frequency shifting of optical signals. By compensating for this additional chromatic dispersion, optimal benefit is obtained in applications utilizing signal conversion, such as midspan optical phase conjugation. Proper compensation of the dispersion introduced by nonlinear media in systems utilizing optical phase conjugation to compensate fiber nonlinearity allows maximum improvement in fiber span bit rate distance products. The compensation can be readily and inexpensively provided in a variety of different optical systems utilizing any of a number of nonlinear conversion media including, for example, dispersion-shifted fiber (DSF), semiconductor lasers, semiconductor laser amplifiers and nonlinear crystals.

The above discussed features, as well as additional features and advantages of the present invention, will become apparent by reference to the following detailed description and accompanying drawings.

BRIEF DESCRIPTION OF THE DRAWINGS

FIGS. 3A–3D show exemplary optical spectra produced at various points in the optical system of FIG. 2.

DETAILED DESCRIPTION

Figure 1:
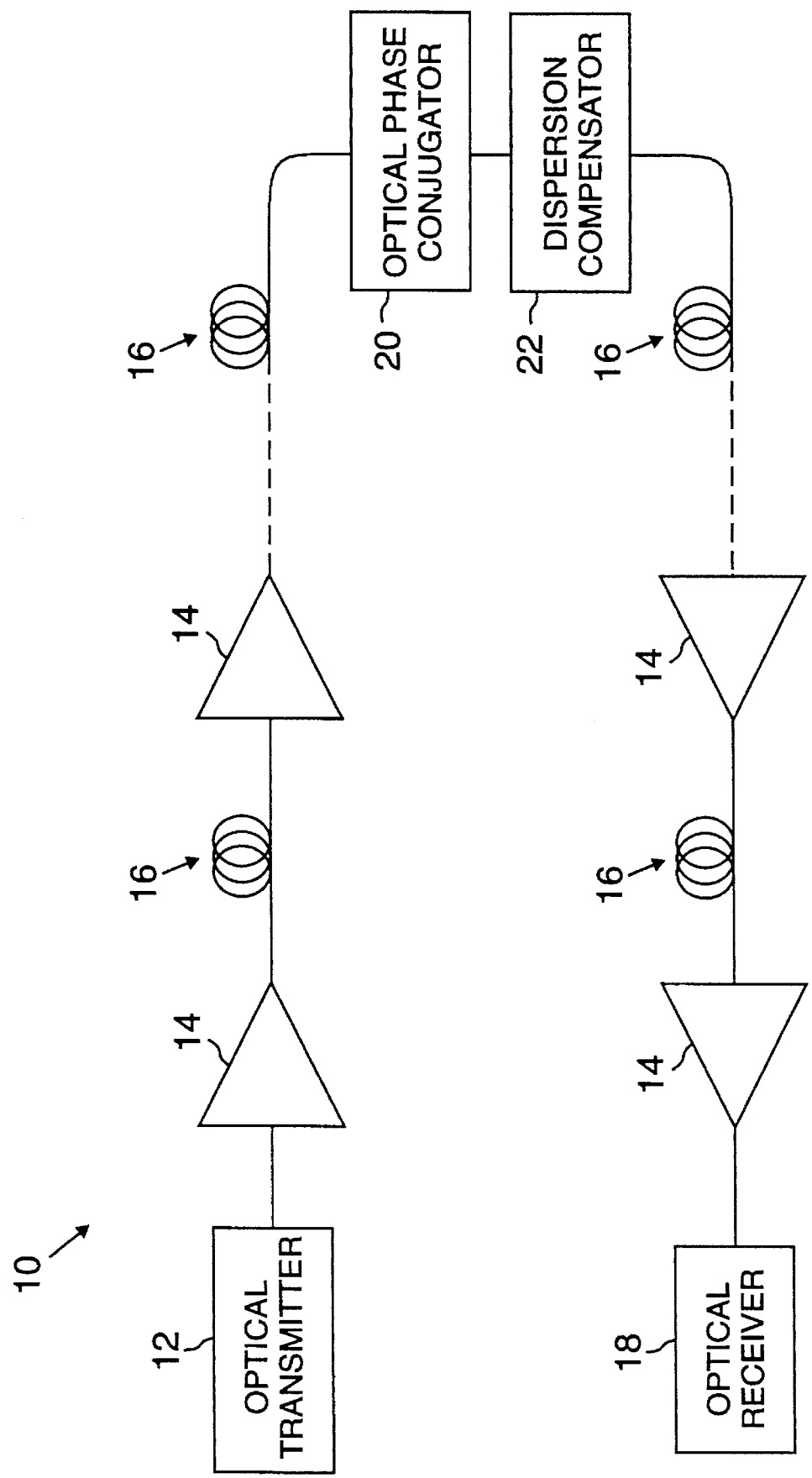
FIG. 1 shows an exemplary optical system utilizing midspan optical phase conjugation with dispersion compensation in accordance with the present invention.

The present invention will first be illustrated in an optical phase conjugation application. FIG. 1 shows an exemplary optical communication system 10 incorporating optical phase conjugation to compensate for fiber dispersion and/or nonlinearities, with additional dispersion compensation in accordance with the present invention. The system 10 includes an optical signal transmitter 12 at one end of an optical fiber span made up of a number of fiber amplifiers 14 and lengths of optical fiber 16. The amplifiers 14 may be, for example, erbium-doped fiber amplifiers (EDFAs), which compensate for the attenuation of the optical fiber and are spaced in a manner to approximate a lossless power distribution over the fiber span. It should be noted that alternative fiber spans suitable for use with the present invention need not include such a distribution, and need not include any in-line amplifiers. For example, if the transmitter 12 provides sufficient optical signal power to communicate effectively through the span, amplifiers 14 could be eliminated. An optical signal receiver 18 is located at an opposite end of the optical fiber span. The fiber span thus provides an optical signal path between the transmitter 12 and the receiver 18.

As used herein, the term "optical signal path" includes any optical transmission medium, including a fiber span, optical waveguide, or free space, through which an optical signal passes. The system 10 also includes an optical phase conjugator 20 which produces a phase conjugate of an input signal in order to compensate for the effects of chromatic dispersion in the fiber span. Additional detail regarding use of optical phase conjugation to compensate for dispersion may be found in, for example, A. Yariv et al., "Compensation for Channel Dispersion by Nonlinear Optical Phase Conjugation," Optics Letters, Vol. 4, No. 2, pp. 52–54, February 1979, which is incorporated by reference herein. The system 10 also utilizes phase conjugator 20 to compensate for fiber nonlinearities in the manner described in the above-cited U.S. Pat. No. 5,365,362, which is incorporated by reference herein. The exemplary optical fiber span of FIG. 1 may be considered to comprise a single segment having a first portion and a second portion. The single optical phase conjugator 20 is located between the first and second portions of the span, which need not be of exactly equal length.

The term "segment" used above in describing the optical fiber span is related to the number of optical phase conjugators within the span. In the embodiment shown in FIG. 1, the fiber span includes only a single optical phase conjugator 20 placed between a first and second portion of the span. Thus, in the single phase conjugator case, the span and segment are one and the same. In other cases, however, it may be desirable to divide the span into several segments, each of which includes a phase conjugator between a first and a second portion thereof.

In systems which utilize phase conjugator 20 to compensate only for first-order group velocity dispersion, conjugator 20 is typically placed near the system midpoint, or near the point L/2 for a fiber span of length L. Such systems may be referred to as linear systems and often utilize an equidistant spacing of amplifiers 14 for convenience. In the systems described in the above-cited U.S. Pat. No. 5,365,362, the interaction between chromatic dispersion and fiber nonlinearities may be compensated by adjusting the power level of an optical signal at various points in the fiber span. The adjustment in optical signal power may be made by appropriate selection of the number of in-line amplifiers 14, the relative positions or spacing between the amplifiers 14, and/or the output power of one or more of the amplifiers 14, with the result that the conjugator 20 again may not be placed at the exact midpoint of the span. By performing power adjustments in this manner, the interplay or interaction between the chromatic dispersion and fiber nonlinearity on a first portion of a given span segment may be undone by, for example, providing the same interactions in the second portion of the given span segment. In these nonlinear systems, it is generally important that at the output of the phase conjugator 20, the phase relationships between all the signals, including any products of nonlinearities, are the conjugate of those phase relationships at the input to the conjugator 20. The present invention recognizes that chromatic dispersion within the phase conjugator 20 will change these phase relationships undesirably.

Phase conjugation of optical signals may be performed using, for example, four-photon mixing, also known as four-wave mixing. Four-photon mixing is a nonlinear process which generates mixing products by mixing an input optical signal with one or more pump signals, or pumps, in a nonlinear conversion medium. The nonlinear conversion medium may comprise, for example, active devices such as a semiconductor laser or a semiconductor laser amplifier, a passive semiconductor, or a length of optical fiber. The four-photon mixing process itself may be either non-degenerate or degenerate. In non-degenerate four-photon mixing, two distinct pump signals mix with an input optical signal to produce the fourth signal. For an input signal of frequency $f_s$, a first pump of frequency $f_{p1}$, and a second pump of frequency $f_{p2}$, the non-degenerate mixing process produces a phase conjugate of the input signal at a frequency $f_{p1}+f_{p2}-f_s$. In one form of degenerate four-photon mixing, two of the mixing signals are supplied by a single pump. Thus, for an optical signal of frequency $f_s$ and a pump at frequency $f_p$, degenerate four-photon mixing produces a phase conjugate of the optical signal at a frequency $2f_p-f_s$. In general, it is important to align the polarization of the input and pump signals prior to phase conjugation. This may be done using polarization controllers in the signal paths of the input and pump signals. Alternatively, the need to control the input and pump signal polarizations may be avoided by using a polarization-insensitive optical phase conjugator, such as those described in U.S. patent applications Ser. No. 08/120,013 (now U.S. Pat. No. 5,400,164) entitled "Polarization-Insensitive Optical Four-Photon Mixer," and Ser. No. 08/120,118 (now U.S. Pat. No. 5,386,314) entitled "Polarization-Insensitive Optical Four-Photon Mixer With Orthogonally-Polarized Pump Signals," both of which are assigned to the assignees of the present invention and incorporated by reference herein. It should be noted that the present invention may utilize other nonlinear processes including, for example, three-photon mixing, to perform signal conversion.

FIG. 1 also includes a dispersion compensator 22 located in the optical signal path of an optical signal passing through the fiber span from optical transmitter 12 to optical receiver 18. The dispersion compensator 22 provides an amount of chromatic dispersion suitable to substantially offset the chromatic dispersion introduced in a conjugated output signal by the optical phase conjugator 20. As previously noted, certain types of optical phase conjugators may introduce significant amounts of chromatic dispersion into the phase conjugated output signal. For example, optical phase conjugator 20 may include a length of dispersion-shifted fiber (DSF) which generates a phase conjugate of an input optical signal using a nonlinear four-photon mixing process. When the phase conjugator 20 is phase-matched, the additional chromatic dispersion introduced by phase conjugator 20 is substantially equivalent to the dispersion which would result if the input optical signal were passed through the nonlinear medium, and then phase conjugated without distortion. This amount of chromatic dispersion is also substantially equivalent to the dispersion which would be introduced in an optical signal passing through the nonlinear medium at the phase conjugate output signal wavelength. In many typical optical signal conversion applications, such an amount of additional chromatic dispersion can significantly degrade the quality of the converted signal output.

Dispersion compensator 22 may be designed to provide an amount of chromatic dispersion sufficient to substantially offset any additional chromatic dispersion introduced into a converted signal output by the nonlinear conversion medium in optical phase conjugator 20. Although it is preferable that the compensator 22 provide sufficient dispersion to substantially offset all of the dispersion introduced by conjugator 20, the compensator 22 may provide only a partial offset of the additional dispersion. The compensator 22 may be placed either before or after the phase conjugator 20 in the system of FIG. 1. In alternative embodiments of the present invention, to be discussed in greater detail below, the conjugator 20 and compensator 22 may be combined into a device which provides both the functions of phase conjugation and dispersion compensation. For example, the dispersion compensation provided by compensator 22 may be distributed within a length of DSF at a number of discrete points, or the phase conjugator 20 may utilize dispersion-flattened fiber which exhibits minimal dispersion at the wavelengths of interest. In addition, the compensator 22 may be designed to provide an offsetting dispersion over a broad band of wavelengths such that the same compensator 22 could be used either before or after the conjugator 20 to provide the same magnitude of dispersion at a given wavelength. Such an embodiment is particularly useful in, for example, multi-channel WDM optical systems.

Figure 2:
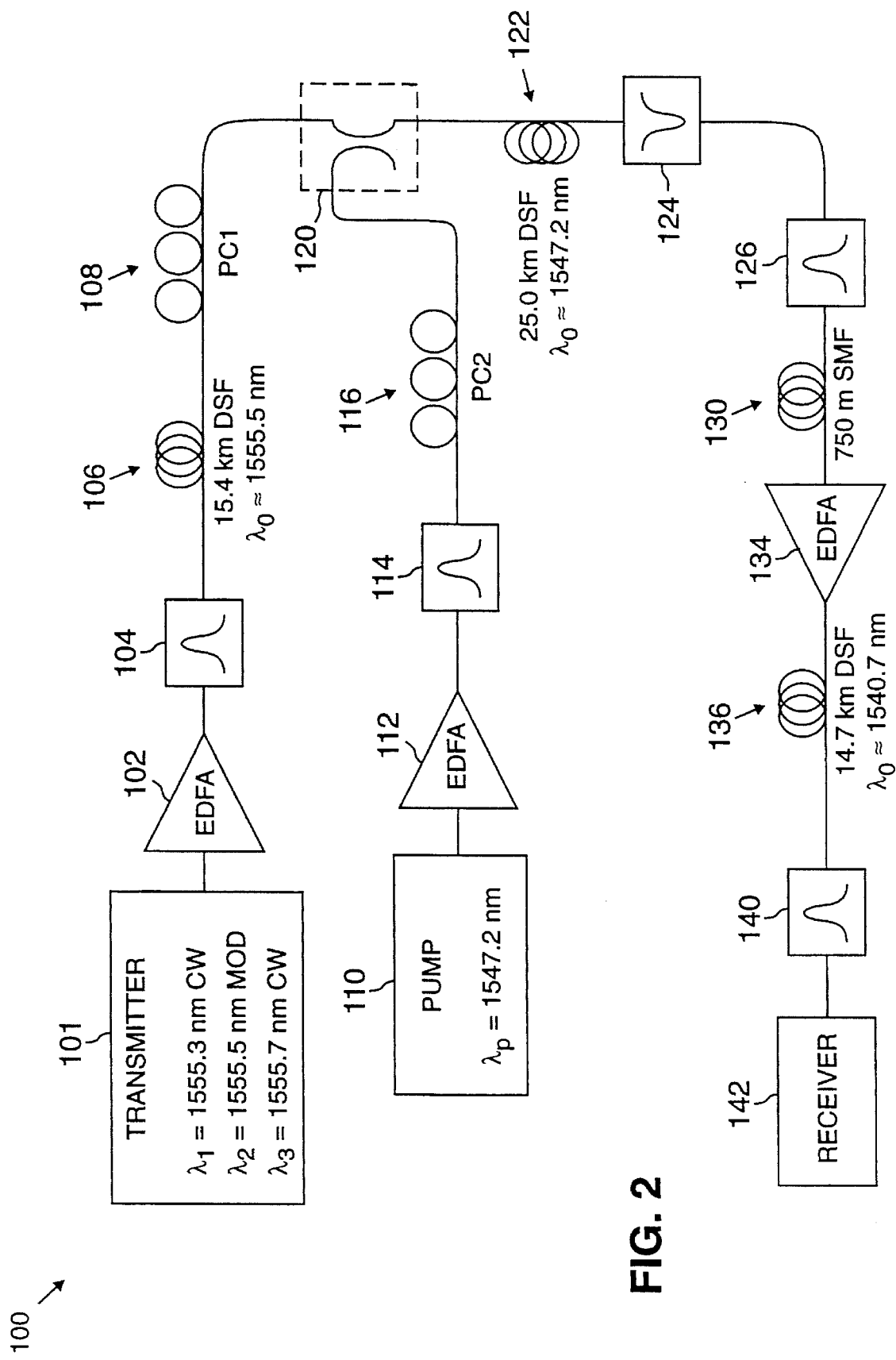
FIG. 2 is a block diagram of another exemplary optical system used to illustrate the improvements provided by utilizing dispersion compensation in accordance with the present invention.

FIG. 2 illustrates an exemplary optical system 100 with compensation in accordance with the present invention for the dispersion introduced in an optical phase conjugation process. The system of FIG. 2 is a three-channel WDM system designed to illustrate the improvements possible using the dispersion compensation techniques of the present invention, and should not be construed as limiting the present invention to use with only certain optical systems. The operation of the system of FIG. 2 will be described with reference to the optical signal spectra of FIGS. 3A–3D, the eye diagrams of FIGS. 4A–4D and the bit error rate curves of FIG. 5.

The system 100 includes a transmitter 101 providing three input optical signals, or channels, at different but closely-spaced wavelengths. A first input optical signal is a continuous-wave (CW) signal at a wavelength of 1555.3 nm. A second input signal, also referred to as the central channel, has a wavelength of 1555.5 nm, and is amplitude modulated with a 2.5 Gbits/sec non-return-to-zero (NRZ) pseudo-random bit sequence of length $2^{23}$-1. A third input optical signal is a CW signal at a wavelength of 1555.7 nm. The three input signals are amplified by an EDFA 102 and then applied to a band-pass filter 104 having a one-nm bandwidth in order to remove undesirable amplified spontaneous emission (ASE) noise. The signal power levels are selected in this example to generate nonlinear effects in the first portion of the fiber span segment in system 100. These effects can be compensated as the phase-conjugated signals propagate through the second portion of the segment, as described in greater detail in the above-cited U.S. Pat. No. 5,365,362. In this embodiment, the power levels of the first and third signals are set to about +9 dBm, and the average power level of the modulated second signal is set to about +7 dBm, as measured at the output of filter 104, by appropriately adjusting the output power of transmitter 101 and/or in-line amplifier 102. A total signal power of about +13 dBm is thus provided at the output of filter 104. As will be shown below, the selected power level introduces nonlinear distortion in the fiber span which is compensated using optical phase conjugation in accordance with the present invention.

Figure 4A:
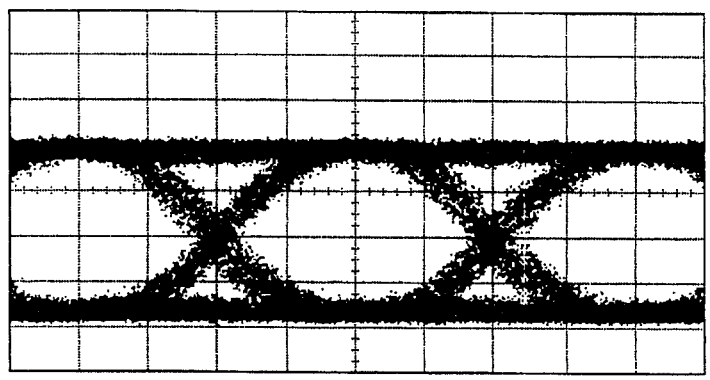
FIGS. 4A–4D show eye diagrams generated at a data rate of 2.5 Gbits/sec at various points in the optical system of FIG. 2.

FIGS. 3A and 4A illustrate a baseline optical signal spectrum and eye diagram, respectively, measured at the output filter 104. The eye diagram in FIG. 4A corresponds to overlapped bits of the $2^{23}$-1 pseudo-random data stream obtained by demodulating the modulated second optical signal. Each horizontal axis division in FIGS. 4A–4D corresponds to a time duration of 100 picoseconds. The modulated second signal was demodulated by filtering the input signal spectrum using a fiber Fabry-Perot filter with a 9-GHz bandwidth and detecting the filtered spectrum using a 2.5-GHz bandwidth avalanche photodiode (APD) receiver. It can be seen from FIG. 3A that the optical spectrum is relatively clean and exhibits strong peaks at each of the input signal wavelengths. The corresponding eye diagram in FIG. 4A indicates a clear separation between high and low logic states, also referred to as upper and lower rails, respectively, in the overlapped bits of the demodulated pseudo-random data stream. The multi-channel optical signal spectrum shown in FIG. 3A is then applied to a first length of fiber 106 consisting of 15.4 km of dispersion-shifted fiber (DSF) having a zero-dispersion wavelength $\lambda_0$ of about 1555.5 nm. As a result of the power levels selected for the input optical signals, the DSF 106 introduces substantial nonlinear distortion on the modulated second signal via four-photon mixing of the three input signals.

Figure 4B:
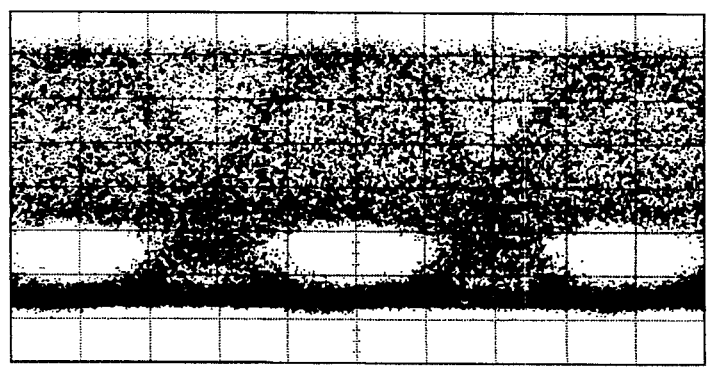

FIGS. 3B is an optical spectrum measured at the output of DSF 106 showing the three input signals as well as additional mixing products resulting from the four-photon mixing in DSF 106. FIG. 4B shows an eye diagram generated by demodulating the modulated second signal after transmission through DSF 106. It can be seen that the upper rail of the eye diagram is severely distorted, indicating that the demodulation process is unable to satisfactorily reproduce the $2^{23}$-1 pseudo-random bit sequence. A further indication of the extent of the distortion introduced in the modulated second signal by DSF 106 is that, using the APD photodiode receiver with the decision threshold fixed at the average signal level, the error rate in the demodulated data stream was so great that it was not possible to synchronize a bit error rate test set, the model number 70842A from Hewlett-Packard, used to measure error rates.

Referring again to FIG. 2, the input signals are passed through a polarization controller 108 to adjust the polarization states of the signals. The signals are then phase conjugated in the following manner. A pump signal having a wavelength $\lambda_p$ of about 1547.2 nm and a power level of about 0 dBm is generated in a pump signal generator 110, amplified in an EDFA 112 to a power level of approximately +20 dBm, and filtered in band-pass filter 114 to remove ASE noise. The pump signal polarization is adjusted using polarization controller 116. Polarization controllers 108 and 116 permit alignment of input and pump signal polarizations prior to optical phase conjugation. The pump signal is then combined with the input optical signals in a signal combiner 120. The combined input and pump signals are applied to a nonlinear conversion medium 122 which, in this embodiment, consists of 25.0 km of DSF with a zero-dispersion wavelength $\lambda_0$ of about 1547.2 nm. The nonlinear medium 122 generates phase conjugates of the input signals, as well as a number of other mixing products, via degenerate four-photon mixing with the pump signal. In this embodiment, the phase conjugates are also shifted in wavelength, with the phase-conjugated center channel shifted to a wavelength of about 1539 nm.

The optical signal path after the nonlinear medium 122 includes filters used to separate the desired phase conjugate output signals, including the modulated center channel, from the residual pump signal, residual input signals, and undesired mixing products. A band-reject filter 124 has a one-nm rejection band at the pump wavelength and removes a substantial amount, up to 90% or more, of the residual pump signal power at the output of the conversion medium 122. A band-pass filter 126 has a four-nm bandwidth and passes the phase-conjugated input signals while attenuating a number of undesired mixing products, additional residual pump signal power, and residual unconjugated input signal power. The optical signal path further includes a length of single-mode fiber (SMF) 130 which provides dispersion compensation in accordance with the present invention in a manner to be described in greater detail below. The phase-conjugated signals are amplified in EDFA 134 to approximately the same power level at the input of the first length of fiber 106, +13 dBm, and then applied to a second length of fiber 136. The fiber 136 consists of 14.7 km of DSF having a zero-dispersion wavelength $\lambda_0$ of about 1540.7 nm and was selected to compensate for nonlinear distortion introduced by the first length of fiber 106, in accordance with the teachings of the above-cited U.S. Pat. No. 5,365,362. The phase-conjugated signals passing through DSF 136 are applied to a band-pass filter 140, which in this embodiment is a fiber Fabry-Perot filter with a 9-GHz bandwidth designed to pass the modulated center channel at about 1539 nm, while rejecting the other phase-conjugated signals. A receiver 142 receives and demodulates the phase-conjugated center channel signal to provide a demodulated $2^{23}-1$ pseudo-random bit stream. As noted above, a suitable receiver is an APD receiver capable of operating at a bit rate of 2.5 Gbits/sec.

Figure 4C:
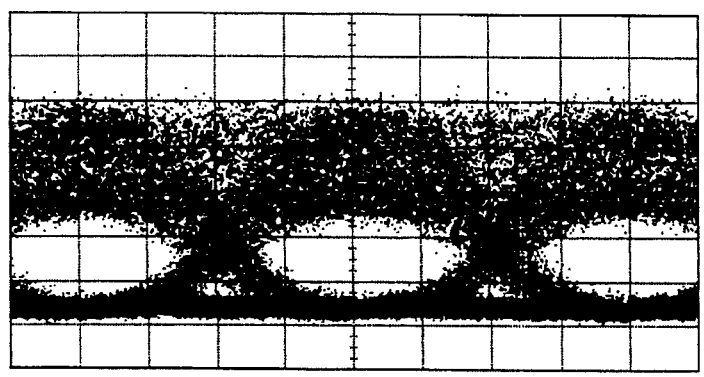

FIGS. 3C and 4C show a signal spectrum and eye diagram, respectively, measured in the optical system of FIG. 2 without dispersion compensation in accordance with the present invention. FIGS. 3C and 4C thus correspond to a system which does not include dispersion compensator 130. As noted above, chromatic dispersion introduced in the nonlinear medium of the phase conjugator, such as in DSF 122 in FIG. 2, can significantly distort the output signal. FIG. 3C shows the phase-conjugated signal spectrum measured at the output of DSF 136. It can be seen that the spectrum at this point includes a number of undesired products, resulting primarily from nonlinear distortion in DSF 106 which remains uncompensated by DSF 136. FIG. 4C shows a corresponding eye diagram measured by demodulating the center channel in receiver 142. The upper rail of the eye diagram remains significantly affected by nonlinear distortion, although comparison with FIG. 4B indicates that some cancellation of nonlinear distortion occurs in passage through DSF 136.

The present invention is based in part on the discovery that the failure of DSF 136 to more fully compensate for nonlinear distortion introduced in DSF 106 is primarily due to chromatic dispersion introduced in the phase conjugator, that is, in DSF 122. As noted above, this chromatic dispersion can be eliminated or compensated in a number of different ways, one of which is to introduce compensating chromatic dispersion at the input or output of the phase conjugator. In the embodiment shown in FIG. 2, an additional amount of positive chromatic dispersion was provided at the output of the conjugator using dispersion compensator 130, consisting of 750 meters of standard SMF. The SMF 130 exhibits a dispersion zero at about 1300 nm, and provides positive dispersion for longer wavelength such as the phase-conjugated center channel wavelength of about 1539 nm. The length of SMF 130 is selected such that the negative dispersion introduced by DSF 122 at 1539 nm is substantially offset.

Figure 4D:
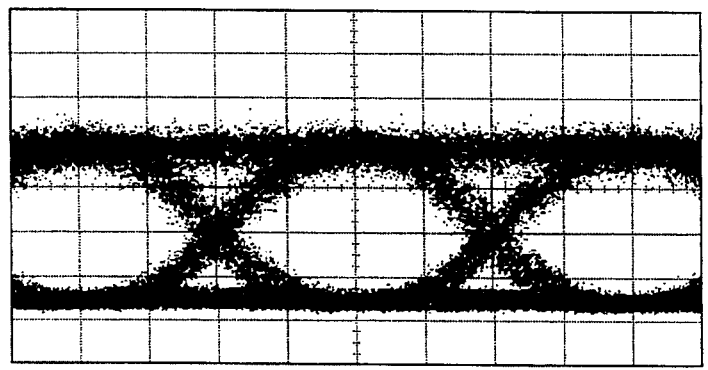

FIGS. 3D and 4D show an optical spectrum and eye diagram, respectively, corresponding to the system of FIG. 2 with a dispersion compensator 130 in accordance with the present invention. With the addition of the dispersion compensator 130, the nonlinear distortion was substantially eliminated. The spectrum of FIG. 3D is measured at the output of DSF 136, and, in comparison with that of FIG. 3C, shows that the number and power levels of nonlinear distortion-induced mixing products are substantially reduced. The eye diagram of FIG. 4D exhibits clear separation between the upper and lower rails, corresponding to high and low data levels in the demodulated data stream, indicating proper demodulation of the pseudo-random bit sequence. By compensating for the dispersion introduced in the phase conjugator, the present invention provides significantly improved compensation of fiber nonlinearities.

Figure 5:
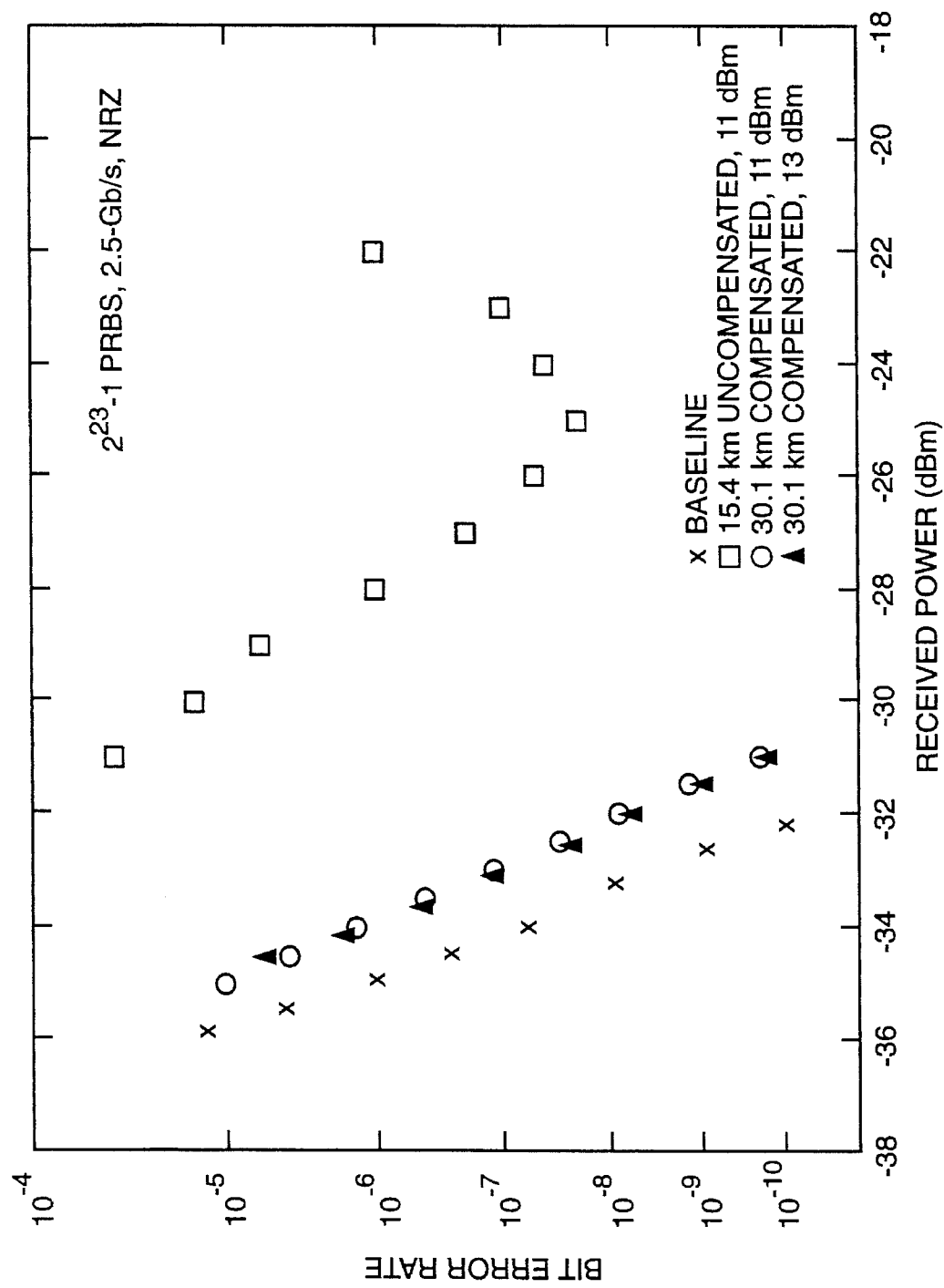
FIG. 5 is a bit error rate (BER) curve showing the performance improvements possible in the exemplary optical system of FIG. 2.

FIG. 5 shows bit error rate (BER) curves for the system of FIG. 2. A Hewlett-Packard model No. 70842A was used as a bit error rate test set to generate the curves. The baseline BER performance curve, corresponding to the spectrum and eye diagram described above in conjunction with FIGS. 3A and 3B, respectively, includes the data points designated X. The performance for the baseline case indicates a receiver sensitivity of about −33 dBm for a bit error rate of $10^{-9}$. The BER curve measured on the signal at the output of DSF 106, corresponding to the spectrum and eye diagram of FIGS. 3B and 4B, respectively, includes data points designated by squares. As noted above, the substantial nonlinear distortion introduced by propagating through the 15.4 km of DSF 106 at relatively high power levels prevented proper synchronization in the BER test set. In order to obtain a BER curve, the total signal power level at the input of the DSF 106 was reduced by 2 dB, to +11 dBm, such that the amount of nonlinear distortion produced in the DSF 106 was reduced and the BER test set could properly synchronize to the demodulated pseudo-random bit sequence. The resulting BER curve indicates that even at a reduced input power level, a BER of less that $10^{-8}$ is not achieved for a modulated signal which has propagated through the 15.4 km length of DSF 106. A performance penalty of about 7 dB relative to the baseline case is seen at a BER of about $10^{-6}$.

The BER curve in FIG. 5 with data points indicated by circles was measured at the output of the system of FIG. 2, using DSF 122 as a phase conjugator and dispersion compensator 130 to compensate for dispersion introduced by DSF 122. The total signal power level applied to the first length of DSF 106 was set to +11 dBm, the same power level used to generate the BER curve measured at the output of DSF 106. The performance penalty relative to the baseline case was dramatically reduced to about 1.5 dB at a BER of $10^{-9}$. The BER curve in FIG. 5 with data points designated by triangles was measured at the output of the system of FIG. 2 with dispersion compensation in accordance with the present invention and a total power level of +13 dBm at the input of the 15.4 km of DSF 106. This curve thus corresponds to the signal spectrum and eye diagram shown in FIGS. 3D and 4D, respectively. Again, the penalty relative to baseline was only about 1.5 dB.

The results shown in FIGS. 3A–3D, 4A–4D and 5 indicate that the present invention can substantially improve the performance of systems which utilize optical phase conjugation to compensate for nonlinearities and/or chromatic dispersion within an optical fiber span. The results further demonstrate that nonlinearity-induced degradation in a WDM system can be adequately compensated by employing phase conjugation techniques. For the above-described exemplary three-channel WDM system, in which the center channel was severely degraded after transmission through 15.4 km of DSF, dispersion-compensated phase conjugation followed by transmission through an additional 14.7 km of DSF was effective in restoring signal integrity. The 2.5 Gbits/sec modulated center channel, previously degraded to the point where a substantial penalty was incurred, was received with a penalty of only about 1.5 dB relative to baseline when a dispersion-compensated phase conjugator was used in the approximately 30 km fiber span. Similar advantages may be obtained in a wide variety of other optical systems, with different span lengths, conversion media, and data rates.

While the exemplary embodiment described in conjunction with FIG. 2 uses DSF as a conversion medium for phase conjugation, and a length of standard SMF after the conversion medium for compensation, it should be understood that this is by way of example rather than limitation. The compensation can be used in either phase conjugation applications or frequency shifting applications or combinations of the two, or in other signal conversion applications. The dispersion compensation can be applied to either the input or the output of the conversion medium or it can be distributed within it. The nonlinear conversion process may be four-photon mixing, three-photon mixing, or another nonlinear process. The conversion medium can be a DSF, SMF or another type of optical fiber, an active semiconductor such as a semiconductor laser or a semiconductor optical amplifier, a passive semiconductor, or a nonlinear crystal such as the quasi-phase-matched $LiNbO_3$ described in C. Xu et al., "Efficient broadband wavelength convertor for WDM optical communication systems," Technical Digest, OFC '94, paper ThQ4, pp. 250–251, San Jose, Calif., 1994, which is incorporated by reference herein. In addition, although the primary nonlinearity which caused the distortion in the system of FIG. 2 was non-degenerate four-photon mixing of the three channel signals, the present invention will provide similar advantages for cancellation of other nonlinearities such as self-phase modulation, cross-phase modulation and stimulated Raman scattering (SRS).

Figure 6:
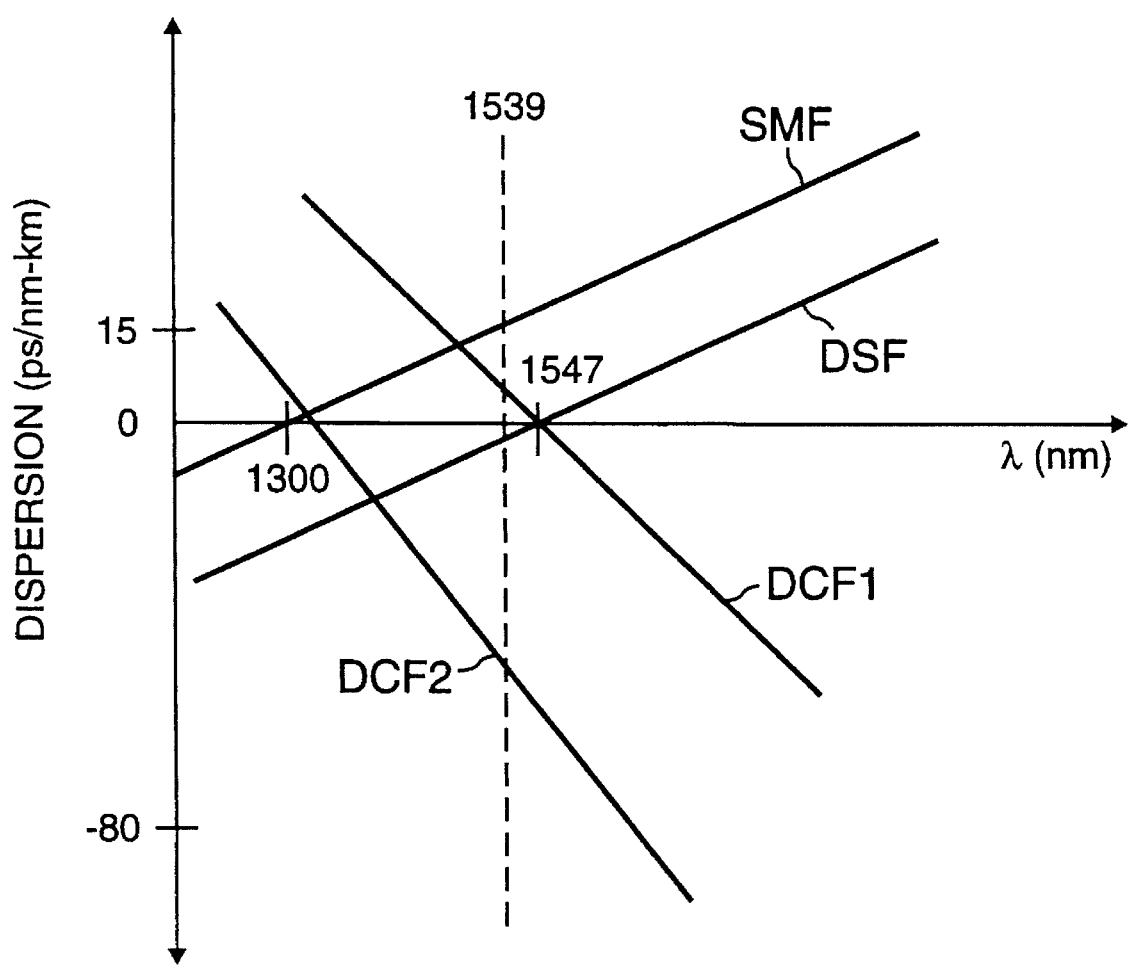
FIG. 6 is a graph showing exemplary plots of fiber chromatic dispersion as a function of wavelength in a number of different types of optical fiber.

FIG. 6 is a graph showing the first-order group velocity dispersion of exemplary optical fiber, in units of ps/nm-km, as a function of wavelength. A number of exemplary first-order group velocity dispersion functions $D(\lambda)$ are labelled SMF, DSF, DCF1 and DCF2. Each of these first-order dispersion functions is approximated as a linear function, such that the second-order dispersion, corresponding to the slope of the linear functions shown, is approximated as a constant. The dispersion function labeled DSF has a dispersion zero at about 1547 nm, and corresponds to the DSF used as a conversion medium in the system of FIG. 2. The function labeled SMF corresponds to the dispersion of a standard SMF having a dispersion zero at about 1300 nm. It can be seen from FIG. 6 that the function DSF exhibits a non-zero amount of dispersion at the phase-conjugate modulated signal wavelength of about 1539 nm. The total amount of dispersion introduced by the DSF at the phase-conjugated signal wavelength is determined by the length of DSF used in the phase conjugation. This additional dispersion may be offset in accordance with the present invention by, for example, including an appropriate length of SMF in the signal path of the fiber span after the phase conjugator.

In general, in a signal conversion using DSF as the nonlinear medium, in which an input signal at a longer wavelength is converted to a signal at a shorter wavelength, negative dispersion should be added at the input of the conversion medium, or positive dispersion added at the output of the conversion medium. The exemplary system of FIG. 2 corresponds to the latter situation. For a case in which an input signal at a shorter wavelength is converted to a signal at a longer wavelength, positive dispersion should be added at the input of the conversion medium, or negative dispersion added at the output of the conversion medium. FIG. 6 indicates that an appropriate length of SMF can be placed at the output of the conversion medium to provide an amount of positive dispersion at the phase-conjugated signal wavelength of 1539 nm suitable to offset the negative dispersion introduced by the DSF conversion medium at 1539 nm. In the system of FIG. 2, a suitable length of SMF was determined to be 750 meters. For optical signal convertors which utilize other types of nonlinear conversion media, the placement of the compensator relative to the conversion medium will generally depend upon the sign of the dispersion introduced by the conversion medium and the compensator.

In an alternative embodiment of the present invention, the dispersion-compensating fiber used may exhibit the same dispersion zero as the fiber used as a conversion medium, but have a slope of the opposite sign. FIG. 6 shows a dispersion function DCF1 which has the same dispersion zero, 1547 nm, as the DSF function shown. A suitable length of fiber having the function DCF1 can therefore be placed either before or after the conversion medium DSF to provide compensation for the dispersion introduced by the medium. FIG. 6 also shows a dispersion function DCF2 which has a large negative dispersion at 1539 nm and a large negative slope. When using DSF as the conversion medium, a suitable length of fiber having the function DCF2 can similarly be placed either before the conversion medium when converting to shorter wavelengths, or after the conversion medium when converting to longer wavelengths, to provide dispersion compensation in accordance with the present invention.

In the embodiments of the present invention utilizing an optical fiber nonlinear conversion medium and an optical fiber dispersion compensator, a suitable amount of dispersion compensation may be determined as follows. In this example, the lengths of the nonlinear conversion fiber and the compensating fiber are designated $L_N$ and $L_C$, respectively, and their first-order dispersion functions are designated $D_N(\lambda)$ and $D_C(\lambda)$, respectively. If the input signal, pump signal, and phase conjugate signal wavelengths are designated $\lambda_s$, $\lambda_p$ and $\lambda_s^*$, respectively, a length $L_c$ of compensating fiber added before the nonlinear conversion medium should satisfy the following relationship:

$$D_N(\lambda_s)L_N \approx -D_C(\lambda_s)L_C.$$

For a length $L_C$ of compensating fiber added after the nonlinear conversion medium, the following relationship should be satisfied:

$$D_N(\lambda_s^*)L_N \approx -D_C(\lambda_s^*)L_C.$$

It should be noted that, in general, when operating under phase-matched conditions, the quantity $D_N(\lambda_s)$ is approximately equivalent to the quantity $-D_N(\lambda_s^*)$. Furthermore, although other types of nonlinear conversion media may have dispersion functions which, unlike those shown in FIG. 6, cannot be approximated as linear to first order, those skilled in the art can readily determine suitable amounts of dispersion compensation in accordance with the teachings of the present invention.

Figure 7:
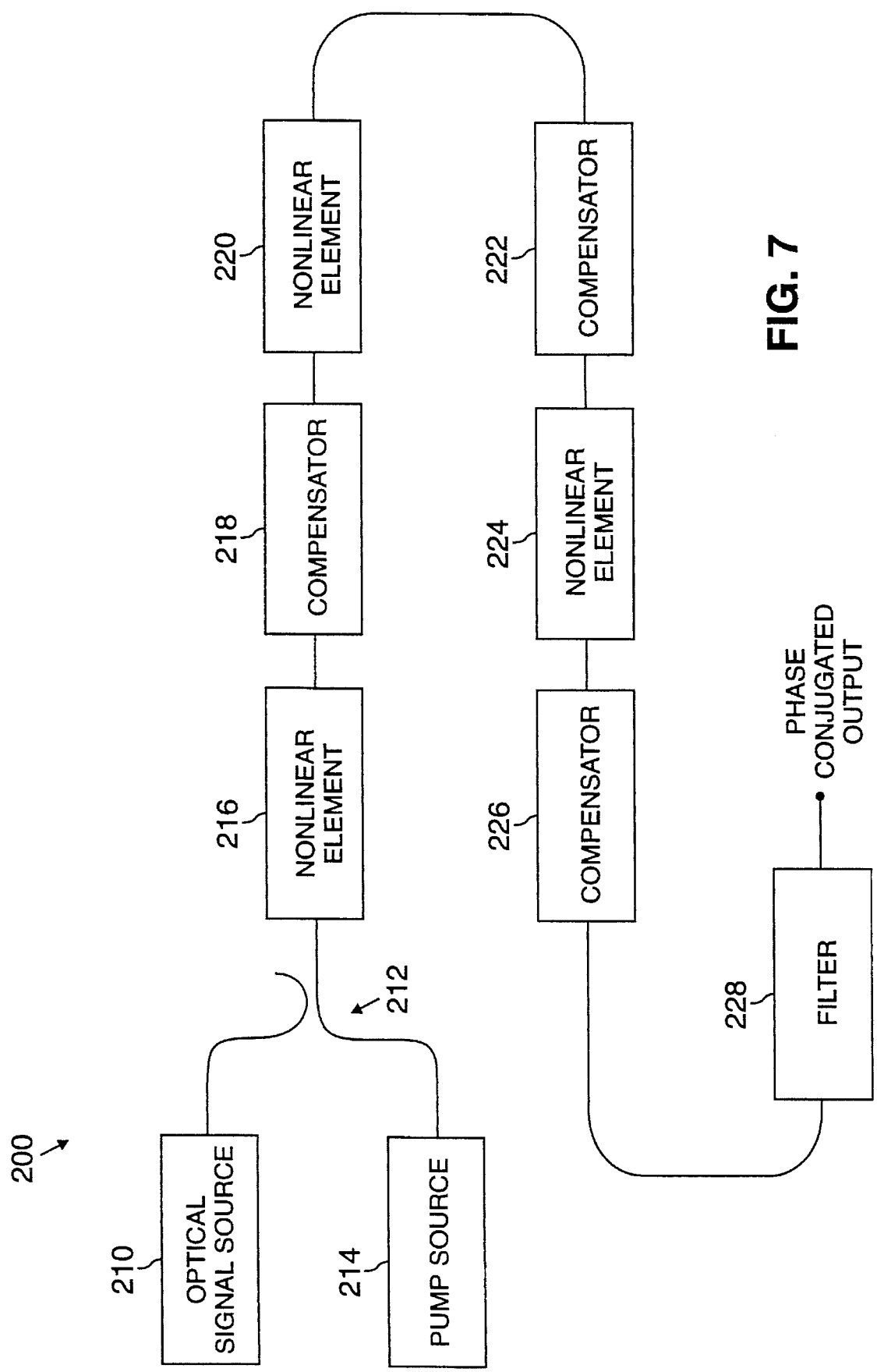
FIG. 7 is a block diagram of an exemplary embodiment of the present invention in which a plurality of dispersion compensators are distributed within a nonlinear conversion medium.

FIG. 7 is a block diagram of an alternative embodiment of the present invention. An optical signal convertor 200 includes an optical signal source 210 which supplies a single-channel or multi-channel input optical signal to a signal combiner 212. The signal combiner 212 receives at least one pump signal from a pump source 214, and combines the input signal and the pump signal onto a common signal path. The input signal and pump signal are then supplied to a first nonlinear element 216 which provides a partial signal conversion function. The chromatic dispersion introduced in the nonlinear element 216 is then partially or completely offset by an opposite amount of dispersion introduced by a compensator 218. Similarly, nonlinear elements 220 and 224 provide further partial signal conversion functions, and introduce additional dispersion which is compensated by corresponding compensators 222 and 226, respectively. The nonlinear elements 216, 220 and 224 thus in combination provide a desired signal conversion, such as phase conjugation and/or frequency shifting of the input signal, and may be considered as a single optical signal convertor such as the phase conjugator 20 of FIG. 1. The nonlinear elements 216, 220 and 224 in combination provide compensation for dispersion introduced in the signal conversion process. In this embodiment, the dispersion compensation is distributed within a nonlinear conversion medium made up of nonlinear elements 216, 220 and 224. As in the other embodiments described above, the nonlinear elements may be, for example, lengths of dispersion-shifted, single-mode or other types of optical fiber, active or passive semiconductors, or nonlinear crystals, and the compensators may be suitable lengths of DSF or SMF, or any of a number of other alternative dispersion compensators. In general, the length of compensators 218, 222 and 226 should be chosen to maintain phase matching for the pump and signal wavelengths used. However, if the compensators 218, 222 and 226 are made from fiber having a dispersion function similar to DCF1 in FIG. 6, then phase matching will generally be maintained regardless of the length of the compensators.

An alternative implementation of the optical signal convertor 200 of FIG. 7 could replace nonlinear elements 216, 220, 224 and compensators 218, 222, 226 with one or more lengths of dispersion-flattened fiber which exhibit a substantially reduced chromatic dispersion over a suitable range of wavelengths. In such an embodiment, the dispersion compensation is distributed within the conversion medium by selecting a fiber conversion medium which exhibits reduced negligible dispersion at the wavelengths of interest, such that minimal dispersion is introduced in the converted signal. For purposes of the present invention, signal convertors which include dispersion-flattened fiber or other types of conversion media specifically designed to exhibit reduced dispersion are considered to fall within the scope of the embodiment of FIG. 7. Additional detail regarding dispersion-flattened fiber may be found in, for example, R. Lundin, "Dispersion Flattening in a W Fiber," Applied Optics, Vol. 33, No. 6, pp. 1011–1014, February 1994, which is incorporated by reference herein.

Alternative dispersion compensators which may be used in accordance with the present invention include planar dispersion compensators, fiber gratings, interferometers, or any other means for introducing an amount of chromatic dispersion sufficient to partially or completely offset dispersion resulting from signal conversion. Exemplary dispersion compensators suitable for use in the present invention are described in, for example, C. Poole et al., "Elliptical-Core Dual-Mode Fiber Dispersion Compensator," ECOC '92 Proceedings, Vol. 3, Post-deadline Paper No. ThPD I.4, pp. 863–866, September 1992; K. Takiguchi et al., "Dispersion Compensation Using a Planar Lightwave Circuit Optical Equalizer," IEEE Photonics Technology Letters, Vol. 6, No. 4, pp. 561–564, April 1994; K. Hagimoto et al., "Penalty free dual-channel 10 Gbit/s transmission over 132 km standard fiber using a PLC delay equalizer with −830 ps/nm," OFC '94 Technical Digest, Post-deadline Papers, pp. PD24-1 to PD24-4, San Jose, Calif., February 1994; M. Onishi et al., "Dispersion Compensating Fiber with a Figure of Merit of 273 ps/nm/dB and its Compact Packaging," OFC '94 Technical Digest, Paper No. 14B1-3, pp. 126–127, July 1994; and K. Hill et al., "Aperiodic In-Fiber Bragg Gratings for Optical Fiber Dispersion Compensation," OFC '94 Technical Digest, Post-deadline Paper, pp. PD2-1 to PD1-4, February 1994, all of which are incorporated by reference herein.

The optical signal conversion techniques of the present invention may be readily extended to systems utilizing more than one signal convertor. For example, in such a system, a fiber span may be divided into a number of segments, each of the segments having a first and a second portion. An optical phase conjugator is placed between the first and second portions of each segment, in order to cancel the nonlinearity effects within that segment. Nonlinearity effects resulting from propagation along the first portion of each segment are compensated during propagation along the second portion thereof. For a fiber span divided into n segments, n optical phase conjugators may be used. The length of the first and second portions of each of the segments, and thereby the placement of the optical phase conjugator within each segment, may be determined in the same manner as in the single segment case. Using additional phase conjugators in effect breaks the fiber span into separately compensated segments of shorter length, and therefore may improve nonlinearity cancellation, since the amount of compensation necessary in each segment is reduced. It should again be noted that the segments need not be of equal or approximately equal length. For example, a fiber span of length L could be divided into two segments, one of length ⅓ L and the other of length ⅔ L. Nonlinearity cancellation within each segment could then be accomplished by placing a phase conjugator between a first and second portion of each segment with the relative fiber lengths, amplifier spacings and signal power levels in each portion determined in the manner described above and in the above-cited U.S. Pat. No. 5,365,362.

Although the above description illustrates the utility of the present invention primarily in terms of a fiber span incorporating an optical phase conjugator providing cancellation of fiber nonlinearities, it should be understood that the apparatus and methods of the present invention are generally suitable for use with any optical system with an optical signal convertor which introduces chromatic distortion in a converted signal. For example, the present invention may be used in a multiple-segment fiber span incorporating dispersion-compensated optical phase conjugators or other signal convertors within each segment of the span. Many variations may be made in the type of signal conversion and conversion medium, the nonlinear process used to generate the converted signal, the type of dispersion compensator, the signal conversion application, as well in other system parameters such as data rate and transmission distance. These and other alternatives and variations in the arrangements shown will be readily apparent to those skilled in the art.

We claim:

1. An apparatus for use in converting an optical signal within an optical signal path, comprising:

a nonlinear conversion medium arranged within the optical signal path and adapted to receive the optical signal and to generate a converted optical signal therefrom; and at least one dispersion compensator arranged within the signal path to provide an amount of chromatic dispersion suitable to offset a portion of the chromatic dispersion introduced in the converted signal by the nonlinear medium.

2. The apparatus of claim 1 wherein the optical signal path includes an optical fiber span, the nonlinear conversion medium is part of an optical phase conjugator arranged within the span, and the converted optical signal is a phase conjugate of the optical signal.

3. The apparatus of claim 1 wherein the optical signal path includes an optical fiber span, the nonlinear conversion medium is part of a frequency shifter arranged within the span, and the converted optical signal is a frequency-shifted version of the optical signal.

4. The apparatus of claim 1 further including:

a pump signal source for providing a pump signal; and a signal combiner arranged within the optical signal path before the nonlinear conversion medium to combine the optical signal and the pump signal, such that the pump signal and optical signal are mixed within the nonlinear conversion medium to generate mixing products which include the converted optical signal.

5. The apparatus of claim 1 wherein the nonlinear conversion medium is a length of dispersion-shifted fiber.

6. The apparatus of claim 5 wherein the length of dispersion-shifted fiber has a second-order group velocity dispersion in the range between about 0.04 and 0.10 ps/nm$^2$-km.

7. The apparatus of claim 1 wherein the nonlinear conversion medium is an active or passive semiconductor.

8. The apparatus of claim 1 wherein the nonlinear conversion medium is a nonlinear crystal.

9. The apparatus of claim 1 wherein the dispersion compensator is located in the optical signal path before the nonlinear conversion medium.

10. The apparatus of claim 1 wherein the dispersion compensator is located in the optical signal path after the nonlinear conversion medium.

11. The apparatus of claim 1 wherein the dispersion compensator is distributed within the nonlinear conversion medium.

12. The apparatus of claim 1 wherein the optical signal is a multi-channel optical signal, and the dispersion compensator provides a chromatic dispersion having a sign opposite to that of the chromatic dispersion introduced by the nonlinear conversion medium over a wavelength range which includes wavelengths of channel signals in the multi-channel optical signal or wavelengths of phase conjugates of the channel signals.

13. A method of converting an optical signal comprising the steps of:

applying the optical signal to a nonlinear conversion medium arranged in an optical signal path of the optical signal;

generating a converted optical signal in the nonlinear conversion medium; and compensating for chromatic dispersion introduced in the nonlinear conversion medium by providing an amount of chromatic dispersion suitable to offset a portion of the chromatic dispersion introduced in the converted signal by the nonlinear conversion medium.

14. The method of claim 13 further including the steps of:

providing a pump signal; and mixing the optical signal with the pump signal in the nonlinear conversion medium to generate the converted optical signal.

15. The method of claim 13 wherein the step of applying the optical signal includes applying the optical signal to a nonlinear conversion medium in an optical phase conjugator arranged in an optical fiber span, and the step of generating a converted optical signal includes generating a phase conjugate of the optical signal.

16. The method of claim 13 wherein the step of applying the optical signal includes applying the optical signal to a nonlinear conversion medium in a frequency shifter arranged in an optical fiber span, and the step of generating a converted optical signal includes generating a frequency-shifted version of the optical signal.

17. The method of claim 13 wherein the step of applying the optical signal to a nonlinear conversion medium includes the step of applying the optical signal to a length of dispersion-shifted fiber.

18. The method of claim 13 wherein the step of applying the optical signal to a nonlinear conversion medium includes applying the optical signal to an active or passive semiconductor.

19. The method of claim 13 wherein the step of applying the optical signal to the nonlinear conversion medium includes applying the optical signal to a nonlinear crystal.

20. The method of claim 13 wherein the step of compensating for chromatic dispersion introduced by the nonlinear conversion medium includes providing a dispersion compensator in the optical path of the optical signal before the nonlinear conversion medium.

21. The method of claim 13 wherein the step of compensating for chromatic dispersion provided by the nonlinear conversion medium includes providing a dispersion compensator in the optical path of the optical signal after the nonlinear medium.

22. The method of claim 13 wherein the step of compensating for chromatic dispersion introduced by the nonlinear conversion medium includes providing dispersion compensation distributed within the nonlinear conversion medium.

23. A method of optical signal transmission, for use in a system including an optical fiber span having at least one segment with a first portion and a second portion, an optical signal transmitter at one end of the optical fiber span for supplying an optical signal to the optical fiber span, and an optical signal receiver at an opposite end of the optical fiber span for receiving the optical signal from the optical fiber span, the method comprising the steps of:

phase conjugating the optical signal in an optical phase conjugator provided between the first and the second portions of the at least one segment;

and compensating for an amount of chromatic dispersion introduced in the phase-conjugated optical signal by the optical phase conjugator.

24. The method of claim 23 wherein the step of compensating for an amount of chromatic dispersion includes providing an additional length of optical fiber having an amount of chromatic dispersion suitable to offset at least a portion of the chromatic dispersion introduced in the phase-conjugated optical signal by the optical phase conjugator.

25. The method of claim 23 further including the step of selecting a power level of the optical signal in at least one of the portions of the at least one segment to compensate for a nonlinearity of the span, by adjusting an output power of an in-line amplifier in at least one of the portions.

26. An optical communication system comprising:

an optical fiber span including at least one segment having a first portion and a second portion;

an optical signal transmitter at one end of the optical fiber span for supplying an optical signal to the optical fiber span;

an optical signal receiver at an opposite end of the optical fiber span for receiving the optical signal from the optical fiber span;

an optical phase conjugator arranged between the first and the second portions of the at least one segment for phase conjugating the optical signal; and a dispersion compensator arranged in the fiber span to compensate for an amount of chromatic dispersion introduced in the phase-conjugated optical signal by the optical phase conjugator.

27. The system of claim 26 wherein the optical phase conjugator includes a length of dispersion-shifted fiber, and the dispersion compensator is a length of single-mode fiber.

28. The system of claim 26 wherein a power level of the optical signal is selected to compensate a nonlinearity of the fiber span within the portions, by adjusting an output power of an in-line amplifier in at least one of the portions.

29. An apparatus for converting an optical signal, comprising:

a nonlinear conversion medium arranged within an optical signal path and adapted to receive the optical signal, wherein the conversion medium includes a plurality of nonlinear elements;

a pump signal source for providing a pump signal to the nonlinear conversion medium, such that the pump signal and optical signal are mixed within the nonlinear conversion medium to generate a converted optical signal; and at least one dispersion compensator arranged in the optical signal path to compensate for chromatic dispersion introduced in the converted optical signal by one or more of the nonlinear elements.

30. The apparatus of claim 29 wherein the nonlinear elements of the nonlinear conversion medium include lengths of dispersion-shifted fiber, with one dispersion compensator arranged in the optical signal path between two of the lengths of dispersion-shifted fiber.

31. An apparatus for converting an optical signal, comprising:

a nonlinear conversion medium including a length of dispersion-flattened fiber having a low dispersion over a wavelength region; and a pump signal source for providing a pump signal to the nonlinear conversion medium, such that the pump signal and optical signal are mixed within the nonlinear conversion medium to generate a converted optical signal.

32. A method of converting an optical signal, comprising the steps of:

providing a nonlinear conversion medium in an optical signal path and adapted to receive the optical signal, the conversion medium including a plurality of nonlinear elements;

providing a pump signal to the nonlinear conversion medium;

mixing the optical signal and pump signal in the nonlinear conversion medium to generate a converted optical signal; and providing at least one dispersion compensator arranged in the optical signal path to compensate for chromatic dispersion introduced in the converted optical signal by one or more of the nonlinear elements.

33. The method of claim 32 wherein the step of providing a nonlinear conversion medium includes selecting a medium having a plurality of lengths of dispersion-shifted fiber as the nonlinear elements, and wherein the step of providing at least one dispersion compensator arranged in the optical signal path includes providing a dispersion compensator between two of the lengths of dispersion-shifted fiber.

34. A method of converting an optical signal, comprising the steps of:

providing a nonlinear conversion medium comprising a length of dispersion-flattened fiber having a low dispersion over a wavelength region;

providing a pump signal to the nonlinear conversion medium; and mixing the optical signal and pump signal in the nonlinear conversion medium to generate a converted optical signal.

* * * * *